United States Patent Office 3,226,339
Patented Dec. 28, 1965

3,226,339
PROCESS FOR PREPARING A PLATINUM METAL-CRYSTALLINE ZEOLITE CATALYST
Vincent J. Frilette, Erlton, N.J., and Russell W. Maatman, Oxford, Miss., assignors to Socony Mobil Oil Company, Inc., a corporation of New York
No Drawing. Filed Nov. 17, 1958, Ser. No. 774,143
10 Claims. (Cl. 252—455)

This invention relates to a new and useful platinum metal-containing catalyst. More particularly, the present invention is directed to a catalytic composition consisting essentially of activated platinum metal distributed within the pores of a crystalline inorganic zeolite characterized by rigid three dimensional networks and uniform interstitial dimensions sufficiently large to permit introduction by ion exchange of a platinum metal-containing ion. The invention is further directed to a method for preparing such catalytic compositions.

Catalysts containing metals of the platinum series, i.e. metals of atomic numbers 44 to 46 and 76 to 78 inclusive, have become of considerable commercial significance in recent years. Thus, such metals impregnated on alumina and silica-alumina supports are widely employed in reforming operations to produce gasolines of high octane number. In general, supported platinum metal catalysts are capable of catalytically effecting a variety of complex hydrocarbon conversion reactions. For example, it is known that during reforming paraffin hydrocarbons undergo isomerization, naphthenes are dehydrogenated to aromatics and olefins are hydrogenated to paraffins. In each of these component reactions, however, there is, in so far as known no marked selectivity for any particular reactant or group of reactants.

The catalyst of the present invention affords a platinum metal-containing catalytic composition having the ability to operate selectively on certain members of one or more different reactants undergoing catalytic conversion. The selectivity attained with the new catalysts described herein is believed attributable to the solid, crystalline, zeolitic structure of the support characterized by rigid three dimensional networks and uniform interstitial dimensions in which the platinum metal component is dispersed. By associating the platinum metal in highly dispersed form with the intra-crystalline spaces for the chemical reaction system which is to be catalyzed thereby, only such conversion paths are obtained which involve reactant or product molecules of such specific shapes or sizes. Such zeolites wherein only molecules of particular size and shape are able to enter are sometimes known as molecular sieves.

In one embodiment, the present invention provides a catalyst consisting essentially of a platinum metal dispersed within the pores of a crystalline zeolitic structure characterized by rigid three dimensional networks and uniform pores sufficiently large to at least admit cyclohexane, and particularly 10 to 13 Angstrom units in diameter.

Another embodiment of the invention resides in a method of catalyst preparation wherein a crystalline aluminosilicate zeolite, initially free of platinum metal, and having rigid three dimensional networks characterized by uniform interstitial dimensions, sufficiently large to permit introduction by ion exchange of a platinum metal-containing ion, is brought into contact with a solution of an ionizable platinum metal compound for a sufficient period of time to effect deposition on the crystalline structure of the zeolite of a platinum metal-containing ion and subsequently dried and thereafter activated by thermal treatment at a temperature in the approximate range of 250° F. to 1100° F. to effect at least partial conversion of the platinum metal-containing ion to a catalytically active state.

A further embodiment of the invention affords a method of catalyst preparation in which a crystalline aluminosilicate zeolite, initially free of platinum metal, and having rigid three dimensional networks characterized by uniform interstitial dimensions sufficiently large to permit introduction by ion exchange of a platinum metal-containing ion, is contacted with a solution of an ionizable platinum metal compound and an ionizable non-platium metal compound whereby a uniform distribution of platinum metal on the zeolite is achieved, followed by drying and activation of the resulting composite upon thermal treatment at a temperature in the approximate range of 250° F. to 1100° F.

A still further embodiment of the present invention involves a method for preparation of a platinum metal-containing catalyst by contacting a crystalline non-platinum metal aluminosilicate zeolite having rigid three dimensional networks characterized by uniform interstitial dimensions, sufficiently large to permit introduction by ion exchange of a platinum metal-containing ion with a solution of an ionizable platinum metal compound for a sufficient time to effect deposition on the crystalline zeolite structure of a platinum metal-containing ion, followed by drying the resulting composite and activating the same by heating in an atmosphere containing free oxygen at a temperature within the approximate range of 250° F. to 1100° F. for ¼ hour to 24 hours and thereafter in an atmosphere of hydrogen at a temperature within the above range to effect at least partial reduction of the platinum metal-containing ion to platinum metal.

In yet another embodiment of the invention, a catalyst is produced by exchanging a substantial proportion of the original metal ion contained in a crystalline aluminosilicate, initially free of platinum metal and having a structure of rigid three dimensional networks characterized by uniform pores approximately 10 to 13 Angstroms in diameter with an ionizable platinum metal compound, in which the platinum metal is in the cationic state, drying the resulting composite and activating the same by thermal treatment at a temperature in the approximate range of 250° F. to 1100° F. to effect at least partial conversion of the platinum metal-containing cation to a catalytically active state.

The crystalline aluminosilicate zeolites employed in preparation of the platinum metal catalyst described herein are adsorbents designated as molecular sieves. Such materials have heretofore been utilized for effecting physical separation of mixtures of materials of varying molecular size. Such substances have been described by Barrer in several publications and in U.S. 2,306,610 and U.S. 2,413,134. Thus, molecular sieves are essentially the dehydrated forms of crystalline natural or synthetic hydrous siliceous zeolites containing varying quantities of sodium, calcium, and aluminum with or without other metals. All or a portion of the sodium or calcium ions normally contained in the molecular sieves structure may be zeolitically replaced with a number of various other ions. The atoms of sodium, calcium or metals in replacement thereof, silicon, aluminum and oxygen in these zeolites are arranged, in the form of an aluminosilicate salt in a definite and consistent crystalline pattern. This structure contains a large number of small cavities, interconnected by a number of still smaller holes or channels. These cavities and channels are precisely uniform in size. Chemically, these zeolites may be represented by the general formula:

$$Me_{x/n}[(AlO_2)_x(SiO_2)_y] \cdot zH_2O$$

where Me is a metal cation, $x/n$ is the number of exchangeable cations of valence $n$, $x$ is also the number of aluminum atoms combined in the form of aluminate, $y$ is the number of silicon atoms and $z$ is the number of water molecules, removal of which produces the characteristic channel system. In the above formula, the ratio $y/x$ is a number from 1 to 5 and usually 1 to 2. At the present time, there are commercially available molecular sieves of the "A" series, and of the "X" series. A synthetic zeolite known as "Molecular Sieve 4A" is a crystalline sodium aluminosilicate having channels about 4 Angstroms in diameter. In the hydrated form, this material is chemically characterized by the formula:

$$Na_{12}(AlO_2)_{12}(SiO_2)_{12} \cdot 27H_2O.$$

The synthetic zeolite known as "Molecular Sieve 5A" is a crystalline aluminosilicate salt having channels about 5 Angstroms in diameter and in which substantially all of the 12 ions of sodium in the immediately above formula are replaced by calcium, it being understood that calcium replaces sodium in the ratio of one calcium ion for two sodium ions. A crystalline sodium aluminosilicate which has pores or channels of approximately 13 Angstrom units in diameter is also available commercially under the name of "Molecular Sieve 13X." The letter "X" is used to distinguish the inter-atomic structure of this zeolite from that of the "A" crystal mentioned above. As prepared, the 13X material contains water and has the unit cell formula $Na_{86}[(AlO_2)_{86}(SiO)_{106}] \cdot 267H_2O$. The 13X material is structurally identical with faujasite, a naturally occurring zeolite. Faujasite, however, is not identical in composition with the 13X zeolite. The synthetic zeolite known as "Molecular Sieve 10X" is a crystalline aluminosilicate salt having channels about 10 Angstrom units in diameter and in which a substantial proportion of the sodium ions of the 13X material have been replaced by calcium.

Molecular sieves of the "A" series consist fundamentally of a tetrahedral three dimensional structure of silicon and aluminum. These tetrahedra are joined by sharing oxygen atoms in such a manner that the ratio of atoms of oxygen to the total number of atoms of aluminum and silicon is equal to two. The electrovalence of the tetrahedra containing aluminum is balanced by the inclusion in the crystal of a cation, for example, an alkali metal or an alkaline earth metal cation. This equilibrium can be expressed by the formula wherein the ratio of $Al_2$ to the number of the cations such as Ca, Sr, $Na_2$, $K_2$ or $Li_2$ is equal to unity. One cation may be exchanged either in entirety or partially by another cation utilizing ion exchange techniques. The spaces between the tetrahedra are occupied by molecules of water prior to dehydration.

Molecular sieves of the "A" series are ordinarily prepared initially in the sodium form of the crystal. The sodium ions in such form may, as desired, be exchanged for other cations. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product, which crystallizes within this hot mixture is separated therefrom and water-washed until the water in equilibrium with the zeolite has a pH in the range of 9 to 12 and thereafter dehydrated by heating.

The empirical formula for the zeolites utilized herein as an initial reactant can be expressed as:

$$M_{2/n}O \cdot Al_2O_3 \cdot XSiO_2 \cdot YH_2O$$

where M is a metal other than those of the platinum series and $n$ its valence. A specific crystalline zeolite has values of X and Y within a definite range. The value of X for any specific zeolite varies in a certain manner depending on whether aluminum or silicon atoms occupy equivalent positions in the lattice. For molecular sieves of the "A" series, X has an average value of 1.85±0.5. The value of Y, depending on the condition of hydration and on the metal cation present may vary from 6 to 0. The average value of Y for the completely hydrated sodium zeolite of the "A" series is 5.1. In the above general formula, the ratio of $Na_2O$ to $Al_2O_3$ is equal to 1. However, if during the process of preparation, excess of the base present in the mother liquor is not eliminated by washing of the crystalline precipitate, analysis will show a ratio slightly greater than 1. On the other hand, if the washing is excessive a certain amount of exchange of the sodium with hydrogen ions may take place bringing the aforementioned ratio to slightly less than 1. The ratio $M_{2/n}O$ to $Al_2O_3$ in the above general formula may accordingly be defined more accurately as being 1±0.2.

Suitable reagents in the preparation of the sodium zeolite of the "A" series include silica gel, silicic acid, or sodium silicate as sources of silica. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the following ranges $$SiO_2/Al_2O_3$$

of 0.5 to 2.5, $Na_2O/SiO_2$ of 0.8 to 3.0 and $H_2O/Na_2O$ of 35 to 200. The reaction mixture is placed in a suitable vessel which is closed to the atmosphere in order to avoid losses of water and the reagents are then heated for an appropriate length of time. A convenient and generally employed process of preparation involves preparing an aqueous solution of sodium aluminate and sodium hydroxide and then adding with stirring an aqueous solution of sodium silicate. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. For temperatures between room temperature (21° C.) and 150° C. an increase in temperature increases the velocity of the reaction and thus decreases its duration. As soon as the zeolite crystals are completely formed they retain their structure and it is not essential to maintain the temperature of the reaction any longer in order to obtain a maximum yield of crystals.

After formation, the crystalline zeolite is separated from the mother liquor, usually by filtration. The crystalline mass is then washed preferably with distilled water, and while on the filter, until the wash water, in equilibrium with the zeolite, reaches a pH of 9 to 12. The crystals are then dried at a temperature between 25° C. and 150° C.

As indicated hereinabove, the sodium ions of the above zeolite may be replaced partially or completely by other cations. These replacing ions include other monovalent or divalent cations such as lithium and magnesium, metal ions of the first group of the Periodic Table such as potassium and silver, metal ions of the second group such as calcium and strontium, and other ions including cobalt and ammonium which, with the sodium zeolite of the "A" series, react as metal in that they replace sodium ions without occassioning any appreciable change in the fundamental structure of the crystalline zeolite. Replacement is suitably accomplished by contacting the crystalline sodium aluminosilicate zeolite with a solution of an ionizable compound of the ion which is to be zeolitically introduced into the molecular sieve structure for a sufficient time to bring about the extent of desired introduction of such ion. After such treatment, the resulting exchanged product is water-washed and dried. The extent to which exchange takes place can be controlled. Thus, taking the exchange of sodium for calcium as a typical example, such exchange can be effected in a proportion of less than 5 percent up to 100 percent by contacting a known amount of the sodium zeolite with solutions containing determined amounts of exchangeable ions.

Sodium zeolite of the "A" series exchanged with calcium or magnesium possesses larger pores than the unexchanged material. An unusual characteristic of the calcium or magnesium exchanged zeolites is that the opening of the pores is not accomplished progressively as the sodium ions are replaced by calcium ions but is produced within a fairly narrow range of composition. When the exchange is 25 percent or less, the substance possesses substantially the same pore characteristics as the sodium zeolite of the "A" series, namely a pore diameter of about 4 Angstrom units. However, when the exchange exceeds 40 percent, the pore characteristics become those of the calcium and magnesium zeolites of the "A" series, i.e. a pore diameter of about 5 Angstrom units. This remarkable affect is evident, for example, by the amount of normal heptane adsorbed on the sodium zeolite of the "A" series with increasing replacement of the sodium ions therein with calcium as shown below:

| Percent of Sodium Ions Replaced in Molecular Sieve 4A by Calcium Ions | Wt. Percent of Normal Heptane Adsorbed at 25° C. Under 45 mm. of Mercury |
| --- | --- |
| 0 | 0.1 |
| 10 | 0.1 |
| 25 | 1.3 |
| 40 | 13.8 |
| 70 | 15.5 |
| 100 | 16.5 |

As noted hereinabove, there are numerous forms of zeolites of the "A" series having exchanged ions. While, generally, the substances having a divalent exchanged ion such as magnesium and strontium zeolites, have pore size characteristics analogous to those of calcium of the "A" series, the exact pore size will differ. Such property can be advantageously employed in affording control of pore size of suitable selection of a particular cation. Similarly, the substances having a monovalent ion such as lithium and silver zeolites of the "A" series have pore size characteristics similar to the sodium zeolite of such series, but the precise pore size is subject to similar control and selection.

Molecular sieves of the "X" series are characterized by the formula:

$$M_{86/n}[(AlO_2)_{86}(SiO_2)_{106}] \cdot 267H_2O$$

where M is Na+ or Ca++ or other ions of the type mentioned hereinabove introduced by replacement thereof and $n$ represents the valence of the cation M. The structure consists of a complex assembly of 192 tetrahedra in a large cubic unit cell 24.95 A. on an edge. The effective pore diameter is 10 to 13 A. and the adsorption volume is about 0.35 cc./gram of dehydrated zeolite.

For molecular sieves of this series, in the empirical formula:

$$M_{2/n}O \cdot Al_2O_3 \cdot XSiO_2 \cdot YH_2O$$

X has an average value of 2.5±0.5. The value of Y, depending on the condition of hydration and on the metal cation present may vary from 8 to 0. The average value of Y for the completely hydrated sodium zeolite of the "X" series is 6.2.

Molecular sieves of the "X" series are prepared in a manner similar to that described hereinabove for preparation of molecular sieves of the "A" series. However, for synthesis of the "X" series molecular sieves, the reaction mixture has a composition, expressed as mixtures of oxides, within the following limits: $SiO_2/Al_2O_3$ of 3 to 5, $Na_2O/SiO_2$ of 1.2 to 1.5 and $H_2O/NaO$ of 35 to 60.

The catalysts of the present invention are prepared by bringing a suitable crystalline zeolite of the nature described above and having uniform interstitial dimensions, sufficiently large to permit introduction by ion exchange of a platinum metal-containing ion, into contact with an ionizable compound of a platinum metal for a sufficient period of time to effect deposition on the crystalline structure of the zeolite of a platinum metal-containing ion derived from such solution, drying the resulting composite and subjecting the same to an activating treatment.

The platinum metals, i.e. metals of the platinum series contained in the present catalyst composition include those having atomic numbers 44 to 46 and 76 to 78 inclusive, namely platinum, palladium, ruthenium, osmium, iridium, and rhodium. Of this group, platinum and palladium are accorded preference. Each of the platinum metals may occur in a variety of compounds. Thus, suitable platinum compounds include chloroplatinic acid, platinous chloride and various compounds containing the platinum ammine complex. The compounds of the useful platinum metals may be subdivided into compounds in which the metal is present in the cation of the compound and compounds in which it is present in the anion of the compound. Both types of compounds, that is types which contain the metal as the cationic state and those which contain the metal in the anionic state may be used. It is, however, a preferred aspect of the method of the invention to employ ionizable platinum metal compounds in which the metal is in the cationic state, i.e. in the form of a cation or cation complex, since with such compounds exchange of the original metal ion contained in the metal aluminosilicate crystalline zeolite with the platinum metal-containing cation is readily achieved. A solution in which the platinum metals are in the form of a cation or cationic complex, e.g. $Pt(NH_3)_6Cl_4$ is readily distinguishable from one in which they are in the anionic portion, e.g. $Na_2[PtCl_6]$, by contacting such solutions with the sodium salt of an orangic cation exchanger. Under such conditions, the cation which contains platinum will be removed from solution by the exchanger, while the platinum metal-containing anion will be substantially unaffected.

When employing a platinum metal compound in which the platinum metal is in the cationic form, it has been found that the platinum metal-containing cation undergoes exchange for the cation originally present in the crystalline aluminosilicate zeolite. Thus, using platinum ammine chloride solution as the platinum metal solution and synthetic faujasite (Molecular Sieve 13X) containing 13.0 weight percent sodium as the crystalline zeolite, it was found that, at equilibrium, the solid after water-washing and drying, contained 4.4 weight percent sodium and 16.4 weight percent platinum. These sodium and platinum analyses indicate that for every platinum atom added to the synthetic faujasite, 3.87 sodium atoms were lost, and that the platinum ammine solution consisted essentially of tetravalent platinum-containing cations.

A further indication that the deposition of platinum by the use of platinum ammine chloride is an ion exchange process in that water-washing does not remove the platinum but salt washing does effect such removal. Thus, a synthetic faujasite (Molecular Sieve 13X) material containing 0.90 weight percent platinum was washed with sodium chloride and the platinum level was reduced to 0.03 weight percent.

It is contemplated that water will ordinarily be the solvent in the platinum metal-containing solutions used. However, it will be understood that other solvents, although generally less preferred, may also be used. Thus, in addition to aqueous solutions, alcoholic solutions etc. of the platinum metal-containing compounds may be employed in the present process. The compounds of the platinum metals undergo ionization in the particular solvent used. The concentration of the platinum metal compound in the solution employed may vary widely depending on the amount of platinum metal desired in the final catalyst composition and on the conditions under which contact between the crystalline aluminosilicate zeolite and such solution is effected. Other conditions being equal, a shorter time of contact between the crystalline zeolite and platinum metal-containing solution may be used with the more concentrated solutions, while a longer period of contact is required with the more dilute solutions.

The solutions of platinum metal compound may be contacted with the crystalline zeolite of uniform pore structure in the form of either a fine powder, a compressed pellet or an extruded pellet. When in the form of a pellet, the crystalline zeolite may be combined with a suitable binder such as clay. The crystalline zeolite is a metal aluminosilicate, initially free of platinum metal having rigid three dimensional networks characterized by uniform interstitial dimensions sufficiently large to permit introduction by ion exchange of a platinum metal-containing ion. Generally, the uniform pore structure of the crystalline zeolite will be made up of pores sufficiently large to at least admit cyclohexane and usually approximately 7 to 13 Angstroms in diameter. In particular, it is preferred to employ crystalline zeolites having pores approximately 10 to 13 Angstroms in diameter since with the latter, exchange of the original non-platinum metal of the aluminosilicate with platinum metal is readily realized. The metal originally contained in the crystalline aluminosilicate zeolite will generally be sodium or calcium, although these may be replaced at least in part by other ions which do not ordinarily affect the crystalline structure such as for example, silver, lithium, potassium, magnesium, cobalt and also ammonium ions.

When the solution contains the preferred cationic form of the platinum metal, such metal exchanges with the cation of the zeolite in the pores of the crystal structure. Because of the strong affinity of the zeolites for platinum metal cations, it has been observed that there is a tendency for the platinum metals to deposit in large quantities at the first point of contact which results in an uneven distribution of the active platinum metal on the zeolite. Moreover, excessively high levels of platinum metal, either locally or throughout the catalyst particle, adversely affect the stability of the crystalline structure. It has been discovered, in one embodiment of the invention, that by including an excess of a foreign salt such as a mineral acid salt of a non-platinum metal which does not adversely affect the crystalline structure of the zeolite, for example, sodium, potassium, lithium, zinc, cadmium, mercury, magnesium, calcium, cobalt, silver, or ammonium in the solution of platinum metal compound and immersing the zeolite in such solution, the tendency for uneven distribution, as well as the content of platinum metal in the final composition may be very well controlled. The foreign salt used may contain the same cation as the crystalline zeolite or if it is desired to exchange the cation of the crystalline zeolite to achieve a desired selectivity of pore size, the foreign salt may be a salt of the new cation. While, a wide range of foreign salt may be included in the platinum metal compound solution, those of the mineral acids, i.e., hydrochloric, sulfuric and nitric acids being comparatively inexpensive and readily available are preferred. Salts which contain ions that destroy the crystal diffraction properties of the zeolite are to be avoided. Such undersirable ions include for example, those of barium, copper and iron. Thus, while it is a distinct advantage of this invention that the selectivity of the novel catalyst described herein may be modified by simple control of the ionic form of the zeolite, the useful forms of the zeolite are those for which the crystal lattice structure remains substantially intact and which show X-ray diffraction patterns in which spacings are characteristic of the crystalline aluminosilicate lattice irrespective of which cation is contained in the zeolite. The ratio of foreign salt to platinum metal compound in the solution used may vary widely depending on the particular crystalline zeolite employed, the chemical nature of the platinum metal compound used and the content of platinum metal desired in the finished catalyst. In general, a high ratio of foreign salt to platinum metal compound produces a low platinum metal content in the final catalyst and conversely a low ratio of foreign salt to platinum metal compound produces a high platinum metal content in the final catalyst. As a rule, the ion ratio of platinum metal to non-platinum metal, derived from the foreign salt, is generally, between about $1 \times 10^{-4}$ and about 1, to afford a resulting composite which contains 0.001 to 5 percent by weight platinum metal.

The volume of solution containing platinum metal compound and preferably further containing a foreign salt as described above may be just sufficient to be adsorbed by the crystalline zeolite. Generally, however, an excess of solution is employed and such excess is removed from contact with the crystalline zeolite after a suitable period of contact and prior to drying of the zeolite. The time of contact between the solution of platinum metal compound and crystalline zeolite is such as to effect deposition on the crystalline structure of the platinum metal-containing ion derived from such solution. It will be appreciated that such period of contact may vary widely depending on the temperature of the solution, the nature of crystalline zeolite used, the particular platinum metal compound employed, and the concentration of platinum metal desired in the final catalyst. Thus, the time of contact may extend from a very brief period of the order of minutes for small particles to long periods of the order of days for large pellets. Generally, the time of contact will, depending on the various aforementioned factors, be within the range of 5 minutes to 10 days. The temperature of the solution will ordinarily be room temperature, but may be an elevated temperature below the boiling point of the solution.

After the contact period the crystalline zeolite is removed from the platinum metal compound solution. Excess platinum metal compound and foreign salt, if employed, are removed, suitably by washing with water. The resulting material is then dried, generally in air, to remove substantially all of the water therefrom.

The dried material is then subjected to an activating treatment essential to render the final composition catalytically active. Such treatment involves heating the dried material at a temperature in the approximate range of 250° F. to 1100° F. to effect at least partial conversion of the platinum metal-containing ion to a catalytically active state. In a preferred aspect of the invention, the dried material is subjected to treatment in an atmosphere containing free oxygen, such as air, at a temperature within the approximate range of 250° F. to 1100° F. for ¼ hour to 24 hours and thereafter in an atmosphere of hydrogen at a temperature within the above range to effect at least partial reduction of the platinum metal-containing ion to platinum metal.

The advantage of utilizing an activating treatment employing initially an atmosphere containing free oxygen and thereafter an atmosphere of hydrogen as compared to hydrogen alone is shown by the following data in which synthetic faujasite (Molecular Sieve 13X) was contacted with platinic ammine chloride in an amount such that the finished catalyst contained 0.82 weight percent platinum. A portion of the solid was heated while initially air and later hydrogen was passed over it. A second portion of the solid was heated only in the presence of flowing hydrogen. The results are set forth below:

6.0 and was slightly cloudy due to a reaction product of chloroplatinic acid and ammonium hydroxide. The solution was filtered and the resulting colorless filtrate was found to contain 1.66 weight percent of platinum. Platinum in such solution was in the form of platinic ammine chloride, i.e. in the cationic form.

Seven milliliters of the above platinic ammine chloride solution were contacted with 5.68 grams of Molecular Sieve 5A (calcium aluminosilicate) in pellet form for a

| Gas | Temp., °F. | Time | Gas | Temp., °F. | Time | Gas | Temp., °F. | Time | DA* |
|---|---|---|---|---|---|---|---|---|---|
| Nitrogen | 75 | 2 hours. | $H^2$ | Rising to 800 | 4 days. | $H^2$ | 800 | 1½ hrs | 22 |
| Dry Air | Rising to 800 | 3 days. | Air | 800 | 2 hrs. | $H^2$ | 800 | 2 hrs | 1,000 |

*DA is dehydrogenation activity, measured by passing cyclohexane and hydrogen at atmospheric pressure over a thin layer of the catalyst at a rate of 55.2 cc. of liquid cyclohexane per hour and hydrogen in a molar ratio of 4:1 of hydrogen to hydrocarbon at 800° F. The rate of benzene production, expressed as moles benzene×10⁻⁶ per second per gram of catalyst is reported as the dehydrogenation activity or "DA."

It will be seen from the foregoing results referring to dehydrogenation activity of the respective catalysts that there is a marked advantage in the use of a gas containing free oxygen, i.e. air, as compared to hydrogen in the preliminary portion of the activation procedure.

The catalyst of this invention contains platinum metal deposited on the crystalline aluminosilicate zeolite. When the platinum metal compound used contains platinum metal in the cationic state, and particularly when an additional foreign salt as described hereinabove is present in the solution of such platinum metal compound, uniform distribution of platinum metal is achieved throughout the zeolitic crystalline structure. The concentration of platinum metal in the finished catalyst may vary depending on the use for which such catalyst is intended. The content of platinum metal in the finished catalyst generally, however, is within the approximate range of 0.001 to 5 percent by weight.

The platinum metal-containing catalysts described herein exhibit high activity for selected members of a hydrocarbon class. Such selective high activity appears to be restricted to those molecules which do not exceed a maximum critical diameter, corresponding to the particular pore size of the crystalline zeolite. It appears that the major portion of the deposited platinum metal is situated within the crystals of the zeolite, and that the crystals of the zeolite admit or reject a reactant molecule depending on whether or not the diameter of the molecule exceeds the size of the opening in the crystal face. Thus, it appears that a molecule which cannot enter the crystal cannot undergo any substantial reaction. There are numerous applications for the catalysts of the present invention. For example, with a mixture of benzene and triethylbenzene, the benzene component undergoes selective hydrogenation upon contacting such mixture, under hydrogenation conditions with a catalyst having a molecular sieve structure of the "X" series, i.e. "Molecular Sieve 10X" or "Molecular Sieve 13X" upon which has been dispersed a platinum metal. In such a reaction, the benzene molecules are sufficiently small in size to enter the pores of the molecular sieve structure while triethylbenzene is sufficiently large to be excluded from the interior of the crystalline pore structure. Accordingly, the benzene reactant readily comes into contact with the platinum metal-bearing surfaces while the triethylbenzene reactant is substantially excluded from such contact and accordingly undergoes negligible hydrogenation.

The following examples will serve to illustrate the catalyst and method of this invention without limiting the same:

*Example 1*

Fifty milliliters of chloroplatinic acid solution containing 2.0 grams of platinum were mixed with 1240 milliliters of ammonium hydroxide solution containing 28 percent by weight $NH_3$. The mixture was heated until the volume was 110 milliliters. The pH of such solution was period of approximately 20 days. At the end of this time, excess solution was drained from the pellets. The pellets were then heated in air at 230° F. for one hour and thereafter at 800° F. for 1½ hours. The pellets were then flushed with nitrogen, heated for 2 hours in an atmosphere of hydrogen at 800° F., flushed with nitrogen and finally cooled. The finished pellets contained 0.63 weight percent platinum.

The product pellets were powdered to particles which passed through a 100 mesh (Tyler) screen and employed as a catalyst in the liquid phase hydrogenation of benzene. For such reaction, 0.829 gram of catalyst powder was mixed with 25 milliliters of benzene. The reaction took place in a closed vessel which was shaken mechanically. Hydrogen was added to the system until the total pressure was about 30 pounds per square inch gauge. The reaction temperature was 145° F. Under such conditions, benzene was converted to cyclohexane. The rate of conversion was determined by measuring the rate of pressure drop due to hydrogen consumption. It was found that $3.82 \times 10^{-3}$ moles of liquid benzene were converted per hour per gram of catalyst.

*Example 2*

In this example, a platinum-containing catalyst was prepared by utilizing a crystalline calcium aluminosilicate having channels of about 10 Angstroms in diameter, i.e. Molecular Sieve 10X and chloroplatinic acid in which platinum is in the anionic form.

Twenty-five milliliters of a solution of chloroplatinic acid containing 0.0625 gram of platinum was mixed with 17.4 grams of Molecular Sieve 10X in the form of clay bonded pellets (containing about 20 percent by weight clay) and permitted to stand for 1 day. The excess solution was then drained from the pellets which were thereafter heated for 1 hour in air at 230° F. and activated by heating for 2 hours at 800° F. The product contained 0.14 weight percent platinum.

The product pellets were powdered to particles which passed through a 100 mesh (Tyler) screen and employed as a catalyst in the hydrogenation of benzene. For such reaction, 2.81 grams of catalyst powder were mixed with 50 milliliters of benzene under the conditions of Example 1. It was found that $1.26 \times 10^{-3}$ moles of liquid benzene were converted per hour per gram of catalyst.

*Example 3*

In this example, a platinum-containing catalyst was prepared by utilizing a crystalline sodium aluminosilicate having channels about 13 Angstroms in diameter, i.e. Molecular Sieve 13X and platinous ammine chloride in which platinum is in the cationic form.

Ten and six tenths (10.6) grams of chloroplatinic acid $[H_2PtCl_6 \cdot 6H_2O]$ were dissolved in 50 milliliters of water. 1.07 grams of solid hydrazine dihydrochloride were added in small portions to effect reduction. The solution was kept on a steam bath until the liquid volume diminished to 5 milliliters, and was thereafter heated for a day at 230° F. in air, followed by 4 hours heating in air at 300° F. The resulting solid product, platinous chloride (PtCl$_2$) was freed of impurities by water washing.

The purified platinous chloride was dissolved in 400 milliliters of concentrated ammonium hydroxide, containing 28 weight percent NH$_3$, by boiling with frequent ammonium hydroxide additions for 7 hours, and thereafter for 2 additional hours without further ammonium hydroxide addition. The final volume of the resulting solution of platinous ammine chloride was 200 milliliters.

Fifty milliliters of the filtered platinous ammine chloride solution were contacted with 3.25 grams of Molecular Sieve 13X in pellet form for approximately 14 days. At the end of this time, excess solution was drained from the pellets. The pellets were then heated in air for 1½ hours at 230° F. and thereafter at 800° F. for 2 hours. The pellets were then flushed with nitrogen, heated for 2 hours in an atmosphere of hydrogen at 800° F. and finally flushed with nitrogen. The finished pellets contained 7.74 weight percent platinum.

The product pellets were powdered to particles which passed through a 100 mesh (Tyler) screen and employed as a catalyst in the dehydrogenation of cyclohexane in the DA test described hereinabove. The activity of the catalyst on the DA scale was 241 compared with a dehydrogenation activity (DA) for the untreated 13X material of essentially zero.

*Example 4*

In this example, a palladium-containing catalyst was prepared by utilizing a crystalline sodium aluminosilicate having channels of about 13 Angstroms in diameter, i.e. Molecular Sieve 13X and palladous ammine chloride, in which palladium was in the cationic form.

Fifty-eight hundredths (0.58) of a gram of palladium chloride [PdCl$_2 \cdot$2H$_2$O] was mixed with 47.4 milliliters of water and 15.8 milliliters of ammonium hydroxide, containing 28 weight percent NH$_3$ and permitted to stand for 16 hours.

Six milliliters of the resulting palladous ammine chloride were contacted with 2.9 grams of Molecular Sieve 13X for 15 days. At the end of this time, excess solution was drained from the solid, which was heated in air for 1 hour at 230° F. and thereafter at 800° F. for 1½ hours. The solid was then flushed with nitrogen, heated for 2 hours in hydrogen at 800° F. and finally flushed with nitrogen. The finished catalyst contained 1.3 weight percent palladium.

The solid product was powdered to particles which passed through a 100 mesh (Tyler) screen and employed as a catalyst in the dehydrogenation of cyclohexane in the DA test described hereinabove. The activity of the catalyst on the DA scale was 67 as compared with a dehydrogenation activity (DA) for the untreated 13X material of essentially zero.

*Example 5*

In this example, a platinum-containing catalyst was prepared by utilizing a crystalline sodium aluminosilicate having channels about 13 Angstroms in diameter, i.e. Molecular Sieve 13X and hydrolyzed chloroplatinic acid.

To 123 milliliters of an aqueous solution containing 9.38 grams chloroplatinic acid [H$_2$PtCl$_6 \cdot$6H$_2$O] was added 27 milliliters of 7.5 molar aqueous solution of sodium hydroxide. The mixture was boiled for ½ hour. When cooled, the pH of the mixture was 11.25. The solution was neutralized with 13.2 milliliters of glacial acetic acid, to give a pH of 7.10. Solid material in the mixture was filtered off.

Seventy-five milliliters of the resulting clear solution was contacted with 1.06 grams of Molecular Sieve 13X for 14 days. Excess solution was then drained from the solid. Dry air was passed over the solid for 16 hours at room temperature, at 140° F. for 7 hours, at 210° F. for 18 hours, at 345° F. for 6 hours, at 625° F. for 2 hours and at 800° F. for 2 hours. The solid was then flushed with nitrogen, treated with hydrogen for 2 hours at 800° F. and finally flushed with nitrogen. The finished product contained 5.78 weight percent platinum.

The solid product was powdered to particles which passed through a 100 mesh (Tyler) screen and employed as a catalyst in the dehydrogenation of cyclohexane in the DA test. The activity of this catalyst on the DA scale was 706 showing it to be an exceptionally active catalyst.

*Example 6*

In this example, a platinum-containing catalyst was prepared by utilizing a crystalline sodium aluminosilicate having channels of about 13 Angstrom units in diameter, i.e. Molecular Sieve 13X, platinic ammine chloride and sodium chloride.

One hundred grams of Molecular Sieve 13X pellets (containing 20 percent clay as a bonding agent) were contacted with 2550 milliliters of a solution containing sodium chloride and platinum as platinic ammine chloride. To make such solution, 50 milliliters of the platinic ammine chloride solution of Example 1 was added to 2500 milliliters of a 3.50 molar sodium chloride solution. After approximately 13 days contact, excess solution was drained from the solid and the solid was washed with water until free of chloride ion. The solid was dried and calcined in air for 6 hours at a gradually increasing temperature to 800° F. The solid was then flushed with nitrogen, treated for 2 hours at 800° F. in an atmosphere of hydrogen and finally flushed with nitrogen. The finished product contained 0.65 weight percent of uniformly distributed platinum.

The product was employed as a catalyst in liquid phase hydrogenation of both benzene and triethylbenzene. For the hydrogenation of benzene, 5 grams of the catalyst was mixed with 10 milliliters of benzene. Operation took place at a temperature of 145° F. and a hydrogen pressure of 30 pounds per square inch gauge. The moles of liquid benzene$\times 10^{-3}$ converted per hour per gram of catalyst was 4.84, as compared with a conversion of benzene of less than 0.1 mole for the untreated 13X material. For the hydrogenation of triethylbenzene, 5 grams of the catalyst was mixed with 10 milliliters of triethylbenzene. Reaction took place at a temperature of 145° F. and a hydrogen pressure of 30 pounds per square inch gauge. The moles of liquid triethylbenzene$\times 10^{-3}$ converted per hour per gram of catalyst was 0.97. The rate of hydrogenating the bulky triethylbenzene molecule was accordingly only 20 percent of the benzene hydrogenation rate, illustrating selective hydrogenation of the smaller benzene molecule as compared with the larger molecule of triethylbenzene. In contrast to the selective hydrogenation observed with the present catalyst, utilization of a conventional hydrogenating catalyst of 6 to 8 mesh (Tyler) particles containing 1.02 weight percent platinum deposited on a silica gel support showed under the foregoing conditions of hydrogenation substantial equal rates of conversion for the benzene and triethylbenzene reactants. With such conventional catalyst, 21.4$\times 10^{-3}$ moles of liquid benzene and 17.4$\times 10^{-3}$ moles of liquid triethylbenzene were converted per hour per gram of catalyst. Thus, the catalyst of the invention exhibits a much greater selectivity in hydrogenation of benzene as compared with triethylbenzene than does a conventional catalyst of platinum on silica gel.

*Example 7*

In this example, a platinum-containing catalyst was prepared by utilizing a crystalline calcium aluminosilicate having channels of about 10 Angstrom units in diameter, i.e. Molecular Sieve 10X, platinic ammine chloride and calcium chloride.

One hundred grams of Molecular Sieve 10X in the form of pellets containing 20 percent clay as a bonding agent were contacted with 2040 milliliters of a solution containing calcium chloride and platinum as platinic ammine chloride. Such solution was made by mixing 40 milliliters of the platinic ammine solution of Example 1 with 2000 milliliters of a 5.69 molar calcium chloride solution. After approximately 13 days contact, excess solution was drained from the solid and the solid was washed with water until free of chloride ion. The solid was dried and calcined as in Example 6. The finished product contained 0.24 weight percent of uniformly distributed platinum.

The product was employed as a catalyst in liquid phase hydrogenation of both benzene and triethylbenzene under the conditions described in Example 6. The moles of liquid benzene converted was $4.03 \times 10^{-3}$ and the moles of liquid triethylbenzene was only $0.18 \times 10^{-3}$ per hour per gram of this catalyst. The rate of hydrogenating the bulky triethylbenzene molecule was accordingly only 4 percent of the benzene hydrogenation rate, showing an even greater selectivity than that of the catalyst of Example 6.

*Example 8*

This example illustrates the necessity for the thermal activation treatment in the preparation of the platinum metal catalysts described herein.

Twenty grams of hydrated chloroplatinic acid (40% Pt) was dissolved in 200 ml. water. To this solution 4800 ml. concentrated $NH_4OH$ was added. After standing 16 hours, the solution was boiled down to 400 ml. The solution was then mixed with 10 liters of 1.5 molar calcium chloride.

Four hundred grams of a crystalline calcium aluminosilicate having channels of about 10 Angstrom units in diameter, i.e. Molecular Sieve 10X, was added to the solution and allowed to stand for several days. The solid was then filtered off and rinsed until the rinse was free of chloride ion ($AgNO_3$ test). The solid was then dried in an air oven at a maximum temperature of 230° F. For easier manipulation, the fine powder was pelleted and ground to a coarse powder.

The unactivated solid was evaluated for hydrogenation activity by placing 0.2 gram in a Pyrex tube, passing over the powder 25 ml./min. of butene-1 mixed with an equal volume of hydrogen at ambient temperature, and analyzing the resulting products in a vapor fractometer. To evaluate activation procedures, samples were treated as indicated in the following table, brought back to room temperature and evaluated as described above. The results are summarized below:

| Test No. | Activation Procedure Used | Mol Percent n-Butane in Hydrocarbon Product |
| --- | --- | --- |
| 1 (Control) | None | None. |
| 2 | Heated 1 hr. at 215° F. in flowing $N_2$ | Do. |
| 3 | Degassed 16 hrs. at 200° F. <1 min | Do. |
| 4 | Heated 1 hr. at 325° F. in flowing $N_2$ | 39. |
| 5 | Heated 1 hr. at 500° F. in flowing $N_2$ | 68. |

It was noted that the inactive materials of tests 1–3 inclusive were white while those of tests 4–5 were a very light grey after activation.

It will be seen from the above example that a thermal activation treatment is essential in converting the platinum metal to a catalytically active state. In this example, butene-1 was readily hydrogenated at ambient temperature in the presence of catalysts that were activated by simple heat-treatment under nitrogen but was unaffected by the untreated platinum catalyst.

It is to be understood that the above description is merely illustrative of preferred embodiments of this invention, of which many variations may be made by those skilled in the art without departing from the spirit thereof.

We claim:

1. A method for preparing a platinum metal-containing catalyst which comprises contacting a crystalline aluminosilicate zeolite initially free of platinum metal and having rigid three dimensional networks characterized by uniform interstitial dimensions, sufficiently large to permit introduction by ion exchange of a platinum metal-containing ion, with a solution of an ionizable platinum metal compound and an ionizable non-platinum metal mineral acid salt for a sufficient period of time to effect uniform distribution on the crystalline zeolite of a platinum metal-containing ion derived from said solution, drying the resulting composite and activating the same by thermally treating at a temperature in the approximate range of 250° F. to 1100° F. to effect at least partial conversion of said platinum metal-containing ion to a catalytically active state.

2. A method for preparing a platinum metal-containing catalyst which comprises contacting a crystalline non-platinum metal aluminosilicate zeolite having rigid three dimensional networks characterized by uniform interstitial dimensions, sufficiently large to permit introduction by ion exchange of a platinum metal-containing ion, with a solution of an ionizable platinum metal compound and an ionizable non-platinum metal mineral acid salt for a sufficient period of time to effect uniform distribution on the crystalline structure of said zeolite of a platinum metal-containing ion derived from said solution, drying the resulting composite and activating the same by treating in an atmosphere containing free oxygen at a temperature within the approximate range of 250° F. to 1100° F. for about ¼ hour to about 24 hours and thereafter in an atmosphere of hydrogen at a temperature within the aforementioned range to effect at least partial reduction of said platinum metal-containing ion to platinum metal.

3. A method for preparing a platinum metal-containing catalyst which comprises contacting a crystalline zeolite consisting essentially of a metal aluminosilicate, which metal is selected from the group consisting of sodium and calcium and having a structure of rigid three dimensional networks characterized by uniform pores approximately 7 to 13 Angstroms in diameter with a solution of an ionizable platinum metal compound and a mineral acid salt of a metal selected from the group consisting of sodium and calcium for a sufficient period of time to effect uniform distribution on the crystalline zeolite of a platinum metal-containing ion derived from said solution, drying the resulting composite and activating the same by thermally treating at a temperature in the approximate range of 250° F. to 1100° F. to effect at least partial conversion of said platinum metal-containing ion to a catalytically active state.

4. A method for preparing a platinum metal-containing catalyst which comprises contacting a crystalline zeolite consisting essentially of a metal aluminosilicate, which metal is selected from the group consisting of sodium and calcium and having a structure of rigid three dimensional networks characterized by uniform pores approximately 7 to 13 Angstroms in diameter with a solution of an ionizable platinum metal compound in which the platinum metal is in the cationic state and a mineral acid salt of a metal selected from the group consisting of sodium and calcium for a sufficient period of time to effect substantial exchange of the metal ion initially contained in said metal aluminosilicate with platinum metal-containing cation, drying the resulting composite and activating the same by thermally treating at a temperature in the approximate range of 250° F. to 1100° F. to effect at least partial conversion of said platinum metal-containing cation to a catalytically active state.

5. A method for preparing a platinum metal-containing catalyst which comprises contacting a crystalline aluminosilicate zeolite initially free of platinum metal and having rigid three dimensional networks characterized by uniform interstitial dimensions, sufficiently large to permit introduction by ion exchange of a platinum metal-containing ion, with a solution of an ionizable platinum metal compound and an ionizable non-platinum metal mineral acid salt, the ion ratio of platinum metal to non-platinum metal contained in said solution being between about $1 \times 10^{-4}$ and about 1, for a sufficient period of time to effect uniform distribution on the crystalline zeolite of a platinum metal-containing ion, drying the resulting composite and activating the same by thermally treating at a temperature in the approximate range of 250° F. to 1100° F. to effect at least partial conversion of said platinum metal-containing ion to a catalytically active state.

6. A method for preparing a platinum-containing catalyst which comprises contacting a crystalline zeolite consisting essentially of a metal aluminosilicate, which metal is selected from the group consisting of sodium and calcium and having a structure of rigid three dimensional networks characterized by uniform pores approximately 7 to 13 Angstroms in diameter with a solution of an ionizable platinum compound in which platinum is in the cationic state and a mineral acid salt of a metal selected from the group consisting of sodium and calcium, the ion ratio of platinum to metal derived from said mineral acid salt being between about $1 \times 10^{-4}$ and about 1, for a sufficient period of time to effect uniform distribution on the metal aluminosilicate of platinum-containing ion, drying the resulting composite and activating the same by thermally treating at a temperature in the approximate range of 250° F. to 1100° F. to effect at least partial conversion of said platinum-containing ion to a catalytically active state.

7. A method for preparing a palladium-containing catalyst which comprises contacting a crystalline zeolite consisting essentially of a metal aluminosilicate, which metal is selected from the group consisting of sodium and calcium and having a structure of rigid three dimensional networks characterized by uniform pores approximately 7 to 13 Angstroms in diameter with a solution of an ionizable palladium compound in which palladium is in the cationic state and a mineral acid salt of a metal selected from the group consisting of sodium and calcium, the ion ratio of palladium to metal derived from said mineral acid salt being between about $1 \times 10^{-4}$ and about 1, for a sufficient period of time to effect uniform distribution on the metal aluminosilicate of palladium-containing ion, drying the resulting composite and activating the same by thermally treating at a temperature in the approximate range of 250° F. to 1100° F. to effect at least partial conversion of said palladium-containing ion to a catalytically active state.

8. A method for preparing a platinum metal-containing catalyst which comprises contacting a crystalline aluminosilicate zeolite initially free of platinum metal and having rigid three-dimensional networks characterized by uniform interstitial dimensions, sufficiently large to permit introduction by ion exchange of a platinum metal-containing ion, with a solution of an ionizable platinum metal compound, and an ionizable mineral acid salt of a metal selected from the group consisting of sodium, potassium, lithium, zinc, cadmium, mercury, magnesium, calcium, cobalt, silver and ammonium for a sufficient period of time to effect uniform distribution on the crystalline zeolite of a platinum metal-containing ion derived from said solution, drying the resulting composite and activating the same by thermally treating at a temperature in the approximate range of 250° F. to 1100° F. to effect at least partial conversion of said platinum metal-containing ion to a catalytically active state.

9. A method for preparing a platinum metal-containing catalyst which comprises contacting a crystalline aluminosilicate zeolite initially free of platinum metal, and having rigid three-dimensional networks characterized by uniform interstitial dimensions, sufficiently large to permit introduction by ion exchange of a platinum metal-containing ion, with a solution of an ionizable platinum metal compound and an ionizable mineral acid salt having the same cation as said aluminosilicate zeolite for a sufficient period of time to effect uniform distribution on the crystalline zeolite of a platinum metal-containing ion derived from said solution, drying the resulting composite and activating the same by thermally treating at a temperature in the approximate range of 250° F. to 1100° F. to effect at least partial conversion of said platinum metal-containing ion to a catalytically active state.

10. A method for preparing a platinum metal-containing catalyst which comprises contacting a crystalline aluminosilicate zeolite initially free of platinum metal, and having rigid three-dimensional networks characterized by uniform interstitial dimensions, sufficiently large to permit introduction by ion exchange of a platinum metal-containing ion, with a solution of an ionizable platinum metal compound, and a mineral acid salt of a metal selected from the group consisting of sodium and calcium for a sufficient period of time to effect uniform distribution on the crystalline zeolite of a platinum metal-containing ion derived from said solution, drying the resulting composite and activating the same by thermally treating at a temperature in the approximate range of 250° F. to 1000° F. to effect at least partial conversion of said platinum metal-containing ion to a catalytically active state.

References Cited by the Examiner
UNITED STATES PATENTS

| | | | |
|---|---|---|---|
| 1,840,450 | 1/1932 | Jaeger | 252—454 |
| 2,306,610 | 12/1942 | Barrer | 252—449 |
| 2,413,134 | 12/1946 | Barrer | 252—449 |
| 2,882,243 | 4/1959 | Milton | 252—455 |
| 2,898,387 | 8/1959 | Teter | 252—466 |

MAURICE A. BRINDISI, *Primary Examiner.*

JULIUS GREENWALD, *Examiner.*